United States Patent [19]

Stehle et al.

[11] 4,011,134
[45] Mar. 8, 1977

[54] PRESSURIZED-COOLANT REACTOR FUEL ROD

[75] Inventors: Heinz Stehle, Marloffstein; Hans-Jurgan Romeiser, Grossgrundlach, both of Germany

[73] Assignee: Kraftwerk Union Aktiengesellschaft, Mulheim (Ruhr), Germany

[22] Filed: Nov. 7, 1974

[21] Appl. No.: 521,849

[30] Foreign Application Priority Data

Nov. 9, 1973 Germany .................. 2356182

[52] U.S. Cl. .................... 176/68; 176/37; 176/79; 176/91 R
[51] Int. Cl.² ...................................... G21C 3/02
[58] Field of Search ............... 176/37, 68, 79, 91 R

[56] References Cited

UNITED STATES PATENTS

| 2,863,816 | 9/1958 | Stacy | 176/79 X |
| 3,647,622 | 3/1972 | Andrews et al. | 176/68 |
| 3,647,623 | 3/1972 | Helps et al. | 176/79 X |
| 3,669,833 | 6/1972 | DeBoeck et al. | 176/79 X |
| 3,713,975 | 1/1973 | Katell | 176/79 |
| 3,725,635 | 4/1973 | Fink et al. | 176/79 X |
| 3,813,286 | 5/1974 | Goldman et al. | 176/79 X |
| 3,823,068 | 7/1974 | Worlton et al. | 176/68 X |

*Primary Examiner*—Samuel W. Engle
*Assistant Examiner*—Peter A. Nelson
*Attorney, Agent, or Firm*—Kenyon & Kenyon Reilly Carr & Chapin

[57] ABSTRACT

A pressurized-coolant reactor fuel rod comprises a cladding tube having ends closed gas-tightly, the tube internally defining a fuel-containing space and in which nuclear fuel pellets are positioned. The tube contains a fission gas plenum chamber formed by a capsule having a flow choke connecting the chamber with the fuel, this capsule being positioned between the fuel and one of the tube ends closed gas-tightly. The capsule is made elastically expandable lengthwise with respect to the cladding tube and it engages and restrains the fuel against displacement lengthwise with respect to the tube, by elastically pressing the fuel away from the tube's closed end adjacent to the capsule.

3 Claims, 2 Drawing Figures

4,011,134

PRESSURIZED-COOLANT REACTOR FUEL ROD

BACKGROUND OF THE INVENTION

The Stehle et al U.S. patent application Ser. No. 495,099, filed Aug. 5, 1974, discloses a pressurized-water reactor nuclear fuel rod comprising a cladding tube having end caps welded on its ends so that the tube is gas-tightly closed. The tube contains fuel pellets extending from one closed end to adjacent its other closed end and between the fuel pellets and this other closed end, a fission-gas collecting capsule is positioned, this capsule featuring a connection between its inside and the inside of the cladding tube and the fuel, in the form of a flow choke.

The fission gas collects inside of the capsule, the flow choke being adequate at this time because the fission gas is produced slowly by the fuel when the fuel rod is in service. In the event of a loss-of-coolant accident, the coolant pressure on the outside of the cladding tube drops, the flow choke preventing very rapid flow-back of the fission gas into the fuel-containing portion of the cladding tube during the short time interval required for the normal emergency core cooling system to become effective. Without this flow choke feature, the fission gas would immediately flow back into the fuel-containing space of the cladding tube, expand the latter, and possibly result in its rupture or at least weakening by bulging of the cladding tube. Under normal operating conditions, the cladding tube is, of course, prevented from inward collapse under the coolant pressure, by the support provided by the fuel pellets on the inside, the capsule acting itself as an internal brace for the fuel cladding throughout the extent of the capsule.

It is to be understood that the fuel cladding tube is made as thin as possible in the interest of nuclear efficiency. Therefore, under the coolant pressure the tube would collapse if it were not for the fact that it is generally completely filled by the fuel pellets and the capsule, the latter extending from and contacting with the fuel pellets and the end cap at that end of the tube, both ends of the tube having the usual welded-on end caps to provide the fuel rod with gas-tightly closed ends. This kind of fuel rod does not vent the fission gas from its inside to its outside, thus needing the fission gas-collecting chamber provided by the capsule.

Prior art fuel rods not incorporating the fission gas-collecting capsule, have a compression spring between the fuel pellets and one closed end of the fuel cladding tube, this maintaining the fuel pellets under elastic compression. Using the fission gas-collecting capsule disclosed by the mentioned patent application, the fuel pellets must be positioned by appropriate dimensioning of the capsule which is itself longitudinally rigid to compression, thus requiring relative precise dimensioning of the length of the capsule, to provide positive positioning of the fuel pellets.

SUMMARY OF THE INVENTION

The object of the present invention is to provide a fuel rod having the advantages of the described fission gas-collecting capsule with its flow choke connection with the fuel-containing space of the fuel rod, and the compression spring positioning of a prior art fuel rod not enjoying the advantages of the capsule and flow choke arrangement.

The present invention attains this object by making the capsule so that it acts as a compression spring. This concept is effected in two ways.

One way is to make the capsule from two mutually telescoped parts with the capsule containing a coil compression spring and with the sliding joint between the two parts functioning as the flow choke, one end of the capsule pressing against the fuel pellets and the other end being held by the welded-on end cap of the fuel rod cladding tube.

The other way is to make the capsule with a radially corrugated wall so that with the capsule made of elastic metal, the capsule itself functions inherently as a compression spring.

BRIEF DESCRIPTION OF THE DRAWINGS

The accompanying drawings somewhat schematically show the above two ways for carrying out the present invention, in which.

DETAILED DESCRIPTION OF THE INVENTION

Figures 1, 2:
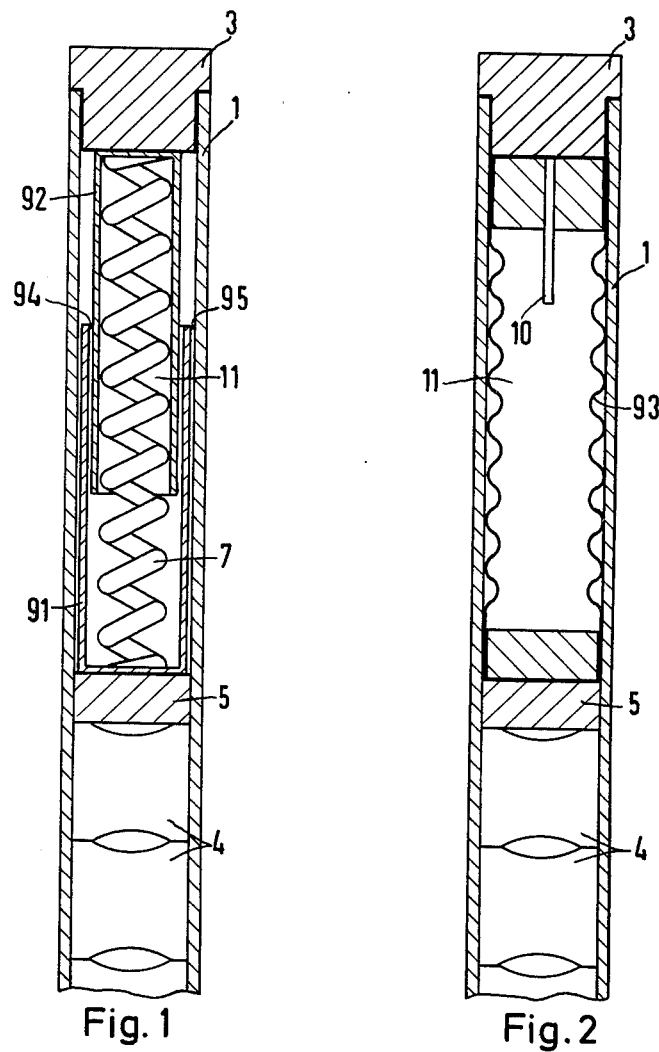
FIG. 1 in longitudinal section shows the end of a fuel rod containing the first form of capsule.
FIG. 2 is a longitudinal section showing the second form.

Having reference to the above drawings, in FIG. 1 the thin-walled cladding tube is shown at 1, this being made of stainless steel or Zircaloy, for example, one of the welded-on end caps being shown at 3 with the understanding that at the other end a corresponding end cap is welded on so that the cladding tube has both ends closed gas-tightly. The cladding tube is of substantial length, but relatively small diameter, an example being a diameter in the area of slightly more than 10 mm, while its length may be forty times or more its diameter. Most of the tube's length forms the fuel-containing space containing the fuel pellets shown at 4, a heat-insulating ceramic disk 5, of adequate porosity, being positioned between the fuel pellets 4 and the fission gas-collecting capsule.

In FIG. 1 the capsule is formed by the longitudinally telescoped parts 91 and 92, fission gas having access to the inside of the capsule, providing the gas-collecting plenum, by way of the annular space 95, between the outer part 91 and the inside of the cladding tube 1, this annular space communicating with an annular space 94 between the outer part 91 and the inner part 92, which are relatively slidable with respect to each other. By appropriate dimension of the diameters of the various parts and of the tube 1, the annular spaces 94 and 95 function as the flow choke previously described. A compression spring 7 on the inside of the two telescoped parts provides the function of the compression spring for holding the fuel pellets 4 against the other closed end (not shown) of the cladding tube 1.

Both parts 91 and 92 are formed like cups so as to enclose the plenum or space 11 where the fission gas collects. This fission gas is given off slowly and collects so that the space 11 may be under relatively high pressure, but the pressure release in the event of a loss-of-coolant accident cannot occur rapidly. At the same time the elastically expandable capsule applies an elastic compression force through the porous heat-insulating disk 5 to the fuel pellets 4 to hold them in position.

In the previously mentioned application one form of flow choke is disclosed as comprising a length of capillary tubing connecting the inside of the capsule with the inside of the cladding tube and the fuel pellets. This kind of flow choke is shown at 10 in FIG. 2. Here the fission gas-collecting space 11 is otherwise completely enclosed by the capsule as in the mentioned patent application, the difference being that in this case the side wall 93 of the capsule is annularly corrugated or otherwise formed to function by itself as a compression spring. In all instances, the capsules are made of metal and because the metal is elastic, the capsule of FIG. 2 can be compressed into position prior to welding on of the end cap 3 and after loading of the pellets 4 in the cladding tube 1.

In FIG. 2 both a flow choke-connected plenum chamber and a compression spring are provided by the capsule without the need for other parts. In this form the ridges of the corrugations 93 of the capsule internally brace the cladding tube 1 against the coolant pressure when the fuel rod is in service; in the FIG. 1 construction the outer part 91 provides this bracing function and this can be made to extend close to the end cap 3, allowing only an intersliding action between the part 91 and 92 for the limited extent required for elastic positioning of the fuel elements. This permits the unsupported span of the cladding tube 1 extending from the end of the outer part 91 to the end cap 3, to be made relatively short and, therefore, adequately braced by the end cap 3 and the adjacent end of the outer part 91.

In all instances, the capsule may be prefabricated, and as a separate part inserted into the cladding tube 1 on top of the previously mentioned fuel pellets 4, the capsule then being elastically compressed for application of the welded-on end cap 3. All of the capsule parts are, of course, made of suitable metal.

Throughout the foregoing, reference has been made to pressurized-water coolant, but the fuel rod of the present invention is applicable to any reactor using a pressurized coolant applying pressure to the outside of the fuel rod when the rod is in service.

What is claimed is:

1. A pressurized-coolant reactor fuel rod comprising a cladding tube having ends closed gas-tightly, said tube internally defining a fuel-containing space, nuclear fuel in said space, said tube containing a fission gas plenum chamber formed by a capsule having a flow choke connecting the chamber with said space and said fuel, said capsule being positioned between said fuel and one of said ends closed gas-tightly, and said capsule being elastically expandable lengthwise with respect to said tube and engaging and restraining said fuel against displacement lengthwise with respect to said tube, by pressing said fuel elastically away from said one of said tube's closed ends.

2. The fuel rod of claim 1 in which said capsule is formed by mutually telescoped cup-shaped parts forming said flow choke by their telescoped fit, and a compression spring inside of said capsule and urging said parts away from each other.

3. The fuel rod of claim 1 in which said capsule is formed with an annularly corrugated side wall which is elastically expandable.

* * * * *